United States Patent
Yamasaki et al.

(10) Patent No.: US 7,087,848 B1
(45) Date of Patent: Aug. 8, 2006

(54) MULTI OPERATING ELECTRONIC COMPONENT

(75) Inventors: Masato Yamasaki, Okayama (JP); Takumi Nishimoto, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/384,249

(22) Filed: Mar. 21, 2006

(30) Foreign Application Priority Data

Mar. 25, 2005 (JP) .............................. 2005-087846

(51) Int. Cl.
*H01H 9/00* (2006.01)
(52) U.S. Cl. ............................ 200/6 A; 200/4; 200/18; 338/47
(58) Field of Classification Search .................... 200/4, 200/1 R, 11 R, 6 A, 6 R, 5 R, 18, 17 R; 338/47, 68
See application file for complete search history.

(56) References Cited

U.S. PATENT DOCUMENTS 5,691,517 A * 11/1997 Yamamoto et al. ......... 200/6 A
5,952,628 A    9/1999 Sato et al.
6,504,115 B1 * 1/2003 Nakai ......................... 200/6 A
6,720,504 B1   4/2004 Nishimoto et al.
6,794,589 B1 * 9/2004 Kubat et al. ................ 200/6 A
6,897,391 B1 * 5/2005 Gavalda ..................... 200/512

FOREIGN PATENT DOCUMENTS

JP      10-241501     9/1998
JP      2003-263940   9/2003

* cited by examiner

*Primary Examiner*—Kyung Lee
(74) *Attorney, Agent, or Firm*—McDermott Will & Emery LLP

(57) ABSTRACT

A multi operating electronic component includes a case, a rotary member, a cover member, an operating knob and a rotationally actuated component. In the central hole of the rotary member rotatably supported by the case, a center leg of the operating knob and an engaging portion provided around the leg are inserted in such a manner as to be movable vertically and tiltable. A pressing central switch or pressing peripheral switches provided in the case are operated by the operating knob. The rotationally actuated component is at least partly formed in the case and is rotated together with the rotary member by the operating knob.

7 Claims, 14 Drawing Sheets

MULTI OPERATING ELECTRONIC COMPONENT

BACKGROUND OF THE INVENTION

1. Field of the Invention

The present invention relates to a multi operating electronic component which is mainly used in the input operation unit of various types of electronic devices and is driven by the user's operation for the operating knob, such as turning, pressing and tilting it.

2. Background Art

FIG. 11 is an external perspective view of a conventional multi operating electronic component. FIG. 12 is a cross sectional view of the component taken along line 12—12 of FIG. 11. FIG. 13 is an exploded perspective view of the component.

The multi operating electronic component includes a box-shaped case having metal cover 1, square frame 2 and base member 3 at the bottom of the case. Metal cover 1 has an open bottom and a U-shaped cross section. Metal cover 1 has circular hole 1A in the center of a top surface thereof. Base member 3 has single pressing switch (hereinafter, switch) 7A in the center and pressing switches (hereinafter, switches) 7B, 7C and the like in its periphery. Base member 3 further has upward-protruding fixed elastic contacts 8.

The multi operating electronic component further includes rotary member 9, which is rotatably supported by intermediate wall 4 of the case. Rotary member 9 supports contact plate 10 which is a movable contact corresponding to fixed elastic contacts 8. Click spring 11, which is fixedly caulked to the bottom surface of intermediate wall 4, creates a click feeling at the time of rotating operating member 12.

Operating member 12 has spherical polyhedron 12A with a polygonal horizontal cross section at its bottom end. Polyhedron 12A is engaged with polygonal throughhole 9A formed in the center of rotary member 9 in such a manner as to be movable vertically and tiltable independently with respect to throughhole 9A and to be rotatable together with rotary member 9. The bottom surface of polyhedron 12A is in contact with switch 7A. Operating member 12 further has cylindrical operating lever 12B extending upward in such a manner as to penetrate through circular hole 13A formed in the center of driver 13 and then to protrude from circular hole 1A formed on the top surface of the case.

Driver 13 is an approximately polygonal plate and has spherical protrusion 13B in the center of its top surface. Spherical protrusion 13B is rotatably and tiltably in contact with the bottom surface of the periphery of circular hole 1A formed on the top surface of the case. Circular hole 13A is engaged with operating lever 12B so that operating lever 12B can be movable vertically and rotatable. Driver 13 is further provided on its bottom surface with protrusions 14A, 14B and the like which are in contact with switches 7B, 7C and the like, respectively.

The operation of the multi operating electronic component thus structured will be described as follows. First, suppose that the user presses operating lever 12B laterally to tilt it in the right direction shown with the arrow X in FIGS. 11 and 12. This pressing makes operating member 12 rotate in the right direction about polyhedron 12A at the bottom end as shown in FIG. 14. This rotation causes driver 13, which is engaged with operating lever 12B at its middle height, to be rotated and tilted in the direction X1. As a result, protrusion 14A at the bottom end of driver 13 that corresponds to the direction in which operating lever 12B has been tilted presses switch 7B downward. When the user releases the lateral pressure applied to operating lever 12B, the elastic restoring force of switch 7B pushes protrusion 14A and thus driver 13 back so as to restore operating member 12 to the original neutral position shown in FIG. 12.

Suppose that the user turns operating lever 12B to rotate operating member 12 horizontally within the neutral position. This rotates rotary member 9, which is engaged with polyhedron 12A formed at the bottom end of operating member 12 so as to be rotatable together, without moving driver 13. As a result, fixed elastic contacts 8 elastically slide along contact plate 10 formed on the bottom surface of rotary member 9, thereby providing a predetermined electric signal.

Suppose the user presses operating lever 12B downward by applying pressure in the direction shown with the arrow V in FIGS. 11 and 12. This pressing causes the bottom surface of polyhedron 12A at the bottom end of operating member 12 to press switch 7A in the center downward without moving driver 13 or rotary member 9.

The multi operating electronic component is mounted on a device in such a manner that the operating knob of the device is mounted on the top end of operating lever 12B. Multi operating electronic components of this type are disclosed, for example, in Japanese Patent Unexamined Publication Nos. H10-241501 and 2003-263940.

The aforementioned conventional multi operating electronic component is mounted on a device in such a manner that operating member 12 protrudes upward and that the operating knob of the device is mounted on the top end of operating member 12. This structure undesirably increases the height of the multi operating electronic component including the thickness of the operating knob.

SUMMARY OF THE INVENTION

The object of the present invention is overcoming the conventional problem and providing a multi operating electronic component with a reduced height including the thickness of the operating knob. The multi operating electronic component of the present invention includes a case, a rotary member, a cover member, an operating knob and a rotationally actuated component. A pressing central switch is provided in the center of the case and pressing peripheral switches is provided in the periphery of the case. The rotary member is provided with a central hole and a flange. The cover member is combined with the case so as to prevent the rotary member from moving away from the case. The operating knob includes a knob main body, a center leg and an engaging portion. The knob main body includes a ring-shaped pressing portion facing the pressing peripheral switches. The center leg is provided on the same side as the ring-shaped pressing portion of the knob main body. The engaging portion, which is engaged with the rotary member, is provided around the center leg. The center leg and the engaging portion are inserted into the central hole of the rotary member in such a manner as to be movable vertically and tiltable. The engaging portion is engaged with the central hole so that the rotary member rotates together with knob main body. When the knob main body is pressed in the direction of the case, the center leg presses the pressing central switch. When the knob main body is tilted around a point at which the engaging portion is engaged with the central hole of the rotary member, the ring-shaped pressing portion presses one of the pressing peripheral switches corresponding to the tilted direction. The rotationally actuated component is at least partly formed in the case and operated by the rotation of the rotary member. This structure makes the operating knob serve also as an outer component of the device on which to mount the multi operating electronic component. As a result, the multi operating electronic component can have a reduced height including the operating knob.

DETAILED DESCRIPTION OF THE INVENTION

Figure 1:
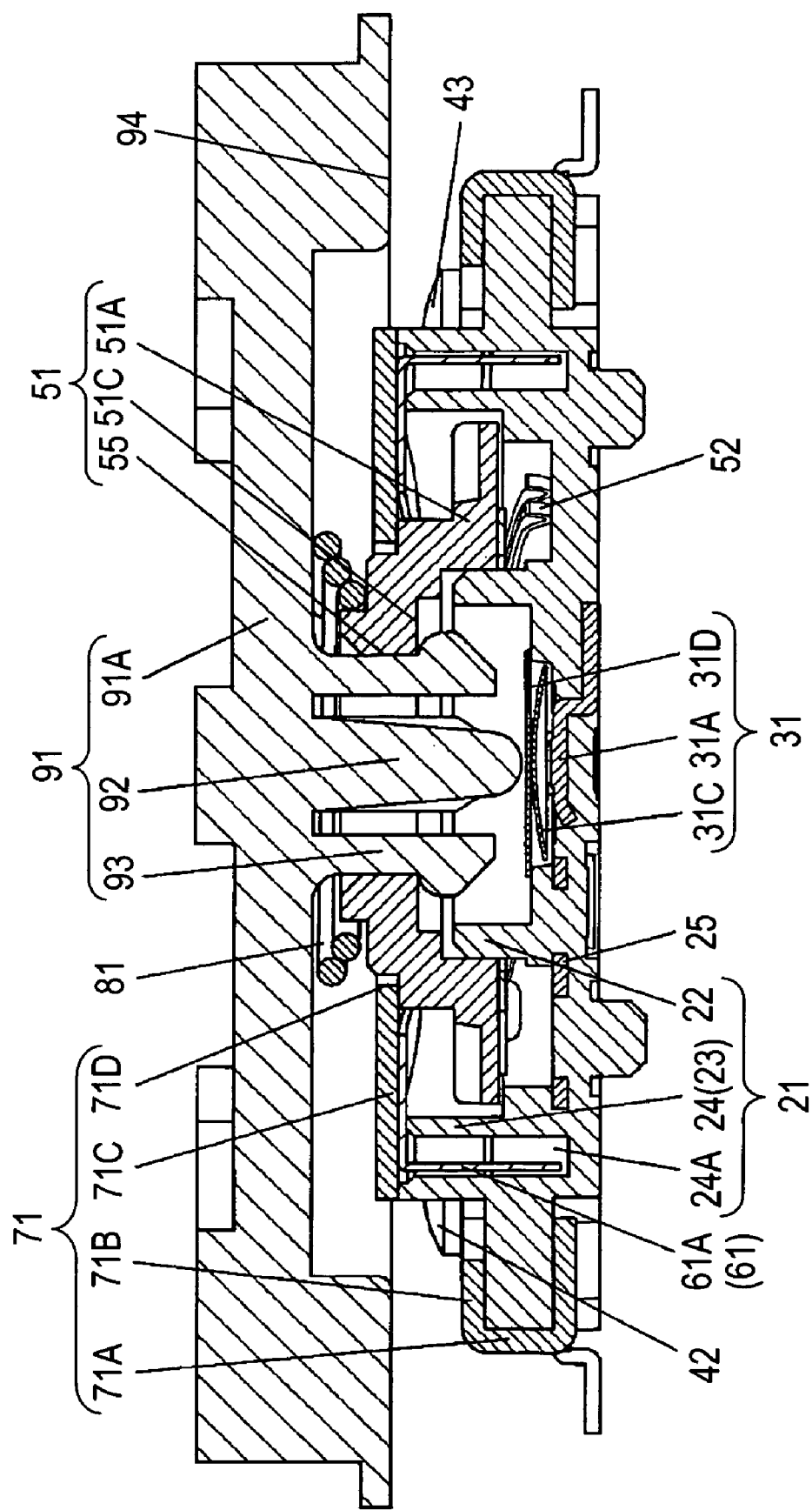
FIG. 1 is a cross sectional view of a multi operating electronic component of an embodiment of the present invention.
Figure 2:
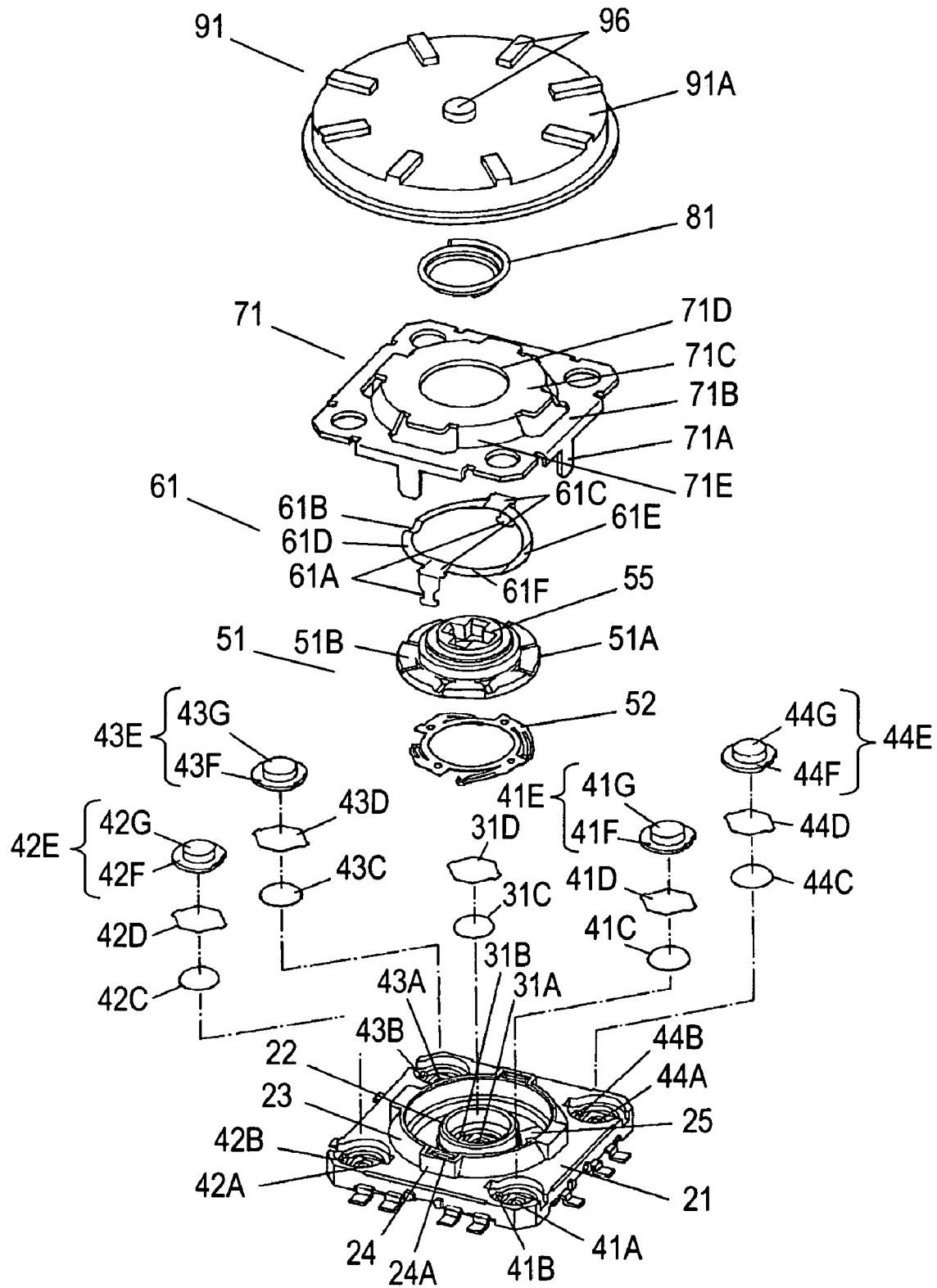
FIG. 2 is an exploded perspective view of the multi operating electronic component shown in FIG. 1.
Figure 3:
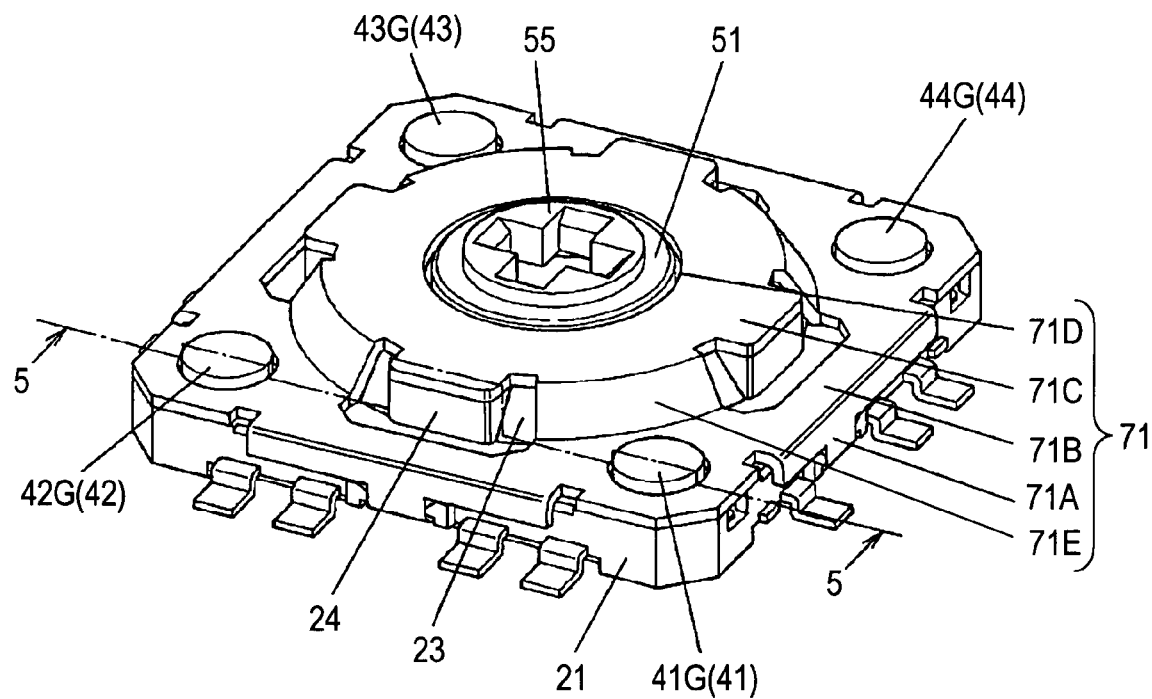
FIG. 3 is a perspective view of the multi operating electronic component shown in FIG. 1 without an operating knob and a coil spring.
Figure 4:
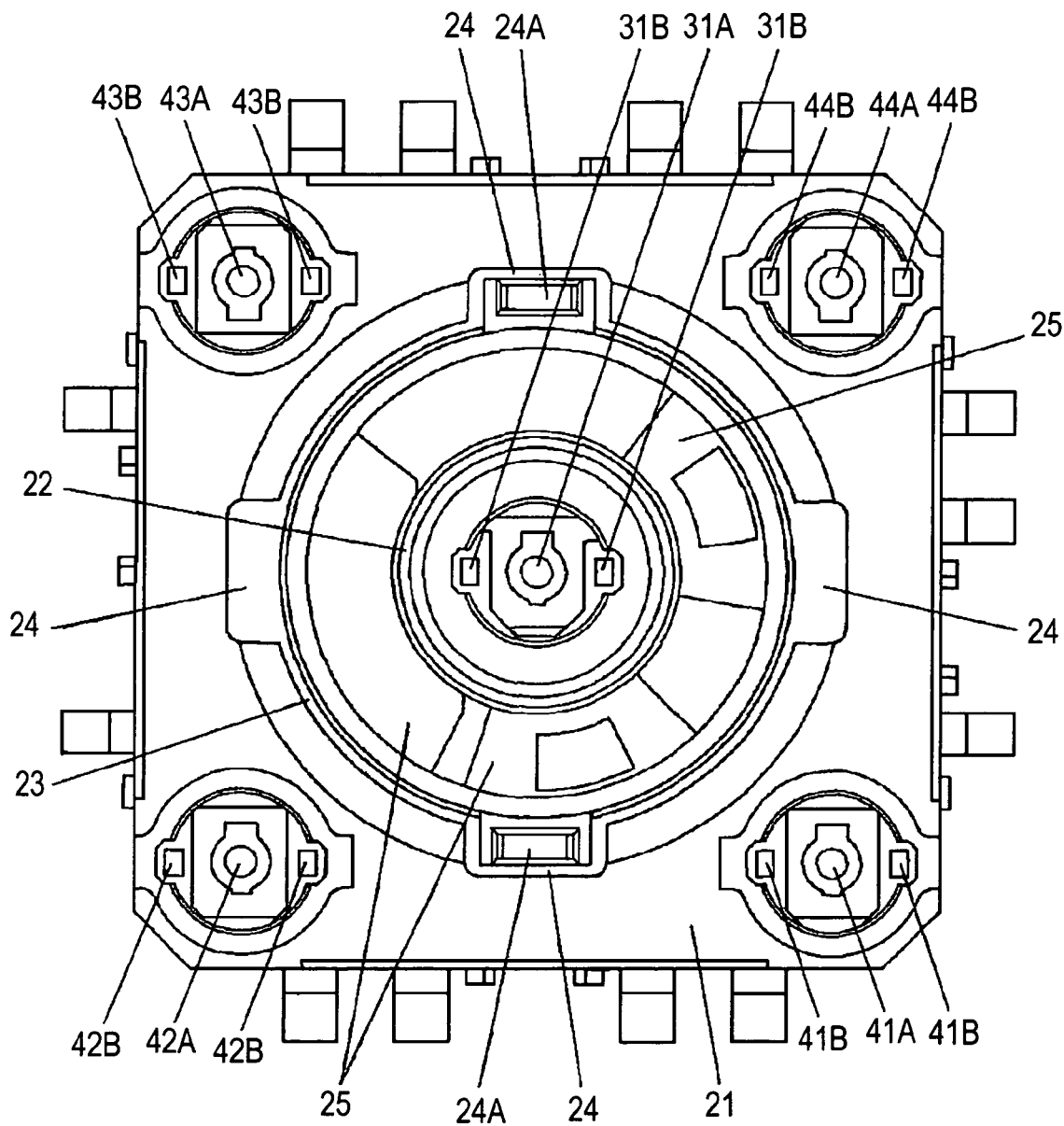
FIG. 4 is a top view of a case of the multi operating electronic component shown in FIG. 1.
Figure 5:
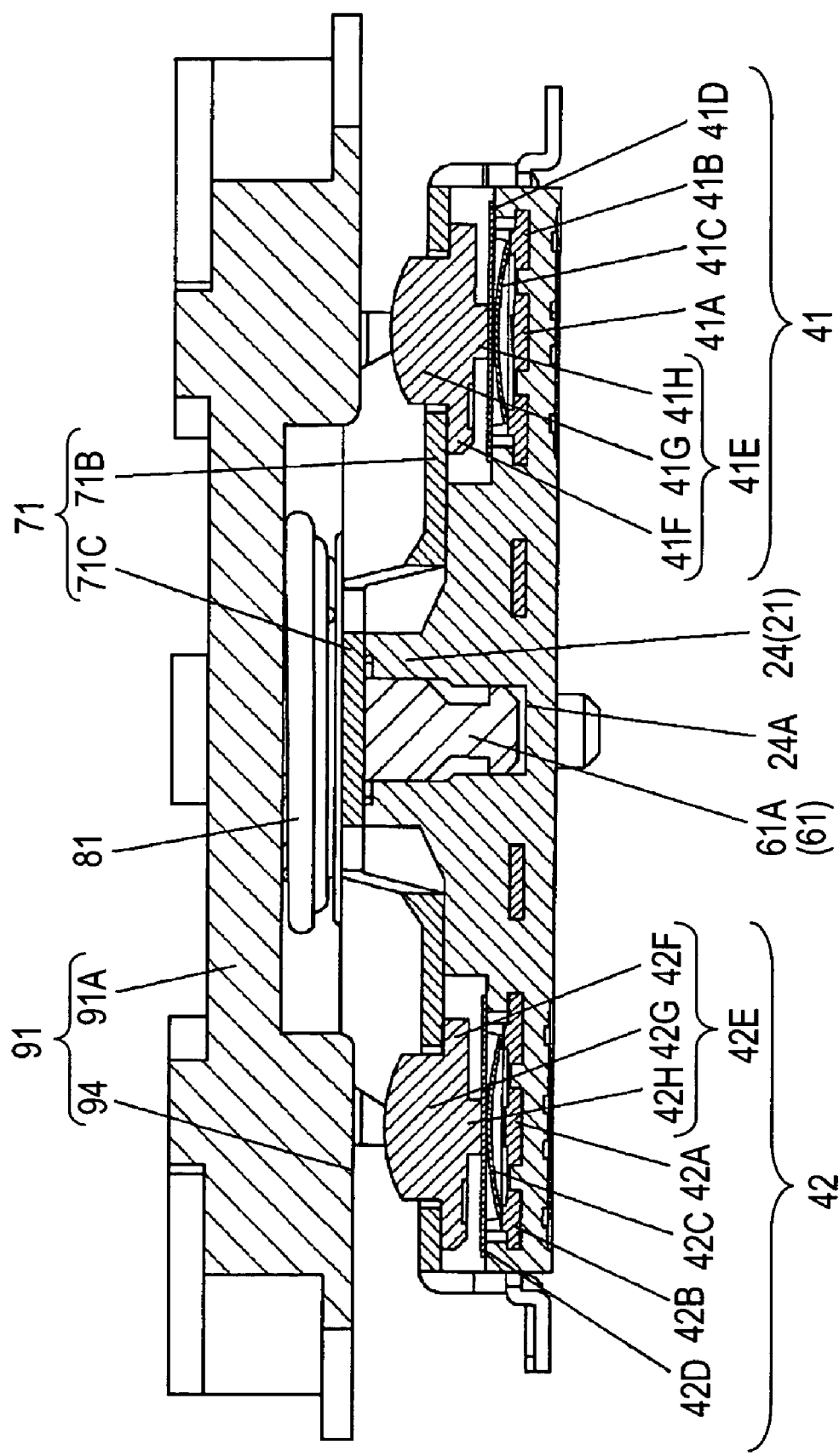
FIG. 5 is a cross sectional view taken along line 5—5 of FIG. 3.
Figure 6:
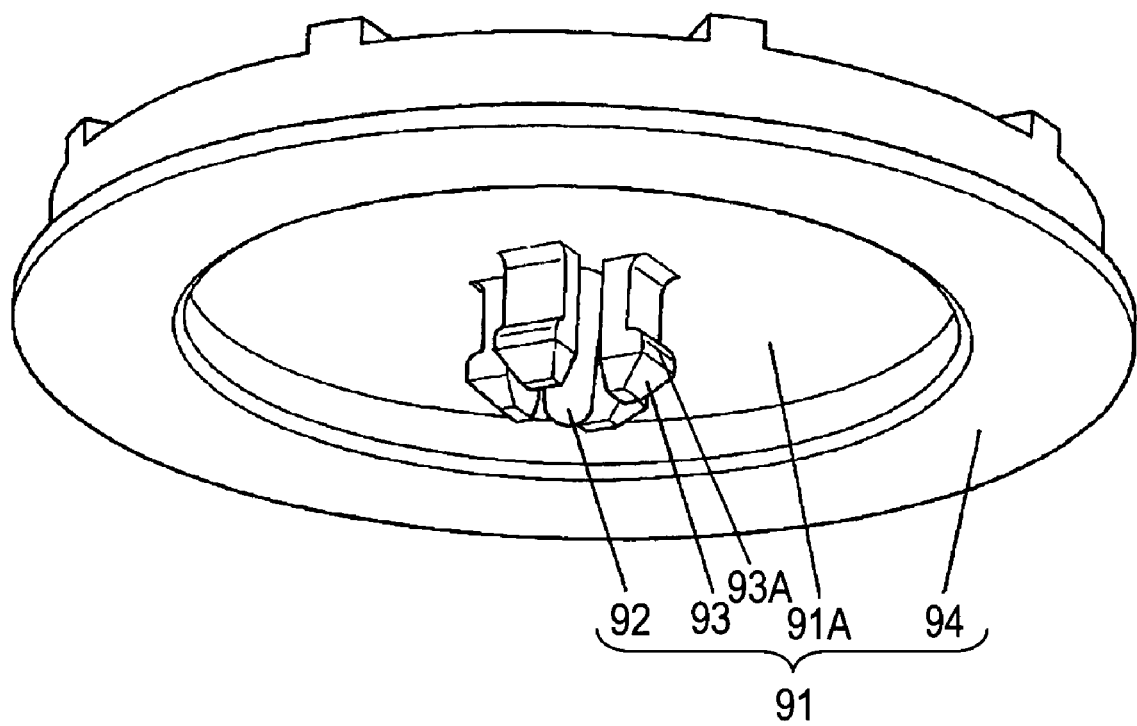
FIG. 6 is a perspective view of the operating knob of the multi operating electronic component of FIG. 1 seen from a bottom side.

FIG. 1 is a cross sectional view of a multi operating electronic component of an embodiment of the present invention, FIG. 2 is an exploded perspective view of the component, and FIG. 3. is an external perspective view of the component without an operating knob and a coil spring. FIG. 4 is a top view of a case, which is a main part of the component, FIG. 5 is a cross sectional view taken along line 5—5 of FIG. 3, and FIG. 6 is a perspective view of the operating knob, which is another main part of the component, seen from the bottom side. FIG. 5 shows the structure shown in FIG. 3 with the operating knob and the coil spring. The multi operating electronic component of the present embodiment includes case 21, rotary member 51, cover member 71, operating knob 91 and a rotationally actuated component.

Case 21 is made of an insulating resin and has an approximately square shape. Pressing central switch (hereinafter, switch) 31 is provided at the center of case 21, and each of four pressing peripheral switches (hereinafter, switches) 41 to 44 is provided at each of the corners.

Switch 31 is composed of central contact 31A, outside contacts 31B, movable contact 31C and insulating sheet 31D. Central contact 31A and outside contacts 31B are exposed on the bottom surface of a circular recess formed in the center of case 21. Movable contact 31C is made of a metal thin plate and has a convexly domed top. Movable contact 31C is placed on outside contacts 31B so that the bottom surface of movable contact 31C is opposed to central contact 31A with a predetermined spacing therebetween. Insulating sheet 31D having flexibility is attached on the top surface around the circular recess so as to cover movable contact 31C.

On the other hand, switch 41 is composed of central contact 41A, outside contacts 41B, movable contact 41C, insulating sheet 41D and driver 41E. Central contact 41A and outside contacts 41B are exposed on the bottom surface of a circular recess formed at a corner of case 21. Movable contact 41C is made of a metal thin plate and has a convexly domed top. Movable contact 41C is placed on outside contacts 41B so that the bottom surface of movable contact 41C is opposed to central contact 41A with a predetermined spacing therebetween. Insulating sheet 41D having flexibility is attached on the top surface around the circular recess so as to cover movable contact 41C. Driver 41E is placed on insulating sheet 41D. Driver 41E has circular large-width portion 41F formed at its middle height, operation portion 41G protruding upward from circular large-width portion 41F, and small-diameter pressing portion 41H protruding downward from circular large-width portion 41F.

Similarly, switch 42 is composed of central contact 42A, outside contacts 42B, movable contact 42C, insulating sheet 42D and driver 42E. Driver 42E has circular large-width portion 42F formed at its middle height, operation portion 42G protruding upward from circular large-width portion 42F, and small-diameter pressing portion 42H protruding downward from circular large-width portion 42F. Switch 43 is composed of central contact 43A, outside contacts 43B, movable contact 43C, insulating sheet 43D and driver 43E. Switch 44 is composed of central contact 44A, outside contacts 44B, movable contact 44C, insulating sheet 44D and driver 44E. Each element in switches 42 to 44 has the same structure as in switch 41.

Case 21 has inner wall 22 and outer wall 23, which are approximately circular ring-shaped and concentrically protrude upward. Switch 31 is placed in the center of inner wall 22, and switches 41 to 44 are placed outside outer wall 23. Inner wall 22, outer wall 23 and switch 31 have substantially the same center position, and inner wall 22 is lower than outer wall 23 in height.

On the bottom of case 21 between inner wall 22 and outer wall 23 is exposed fixed contact 25 having predetermined patterns shown in FIG. 4. Fixed contact 25 is a contact pattern corresponding to an incremental encoder.

Outer wall 23 is provided with rectangular protrusions 24 at a pitch of 90 degrees. Of rectangular protrusions 24, a pair of rectangular protrusions 24 facing each other with the center of outer wall 23 therebetween are each provided with fixing hole 24A formed downward.

Figure 7:
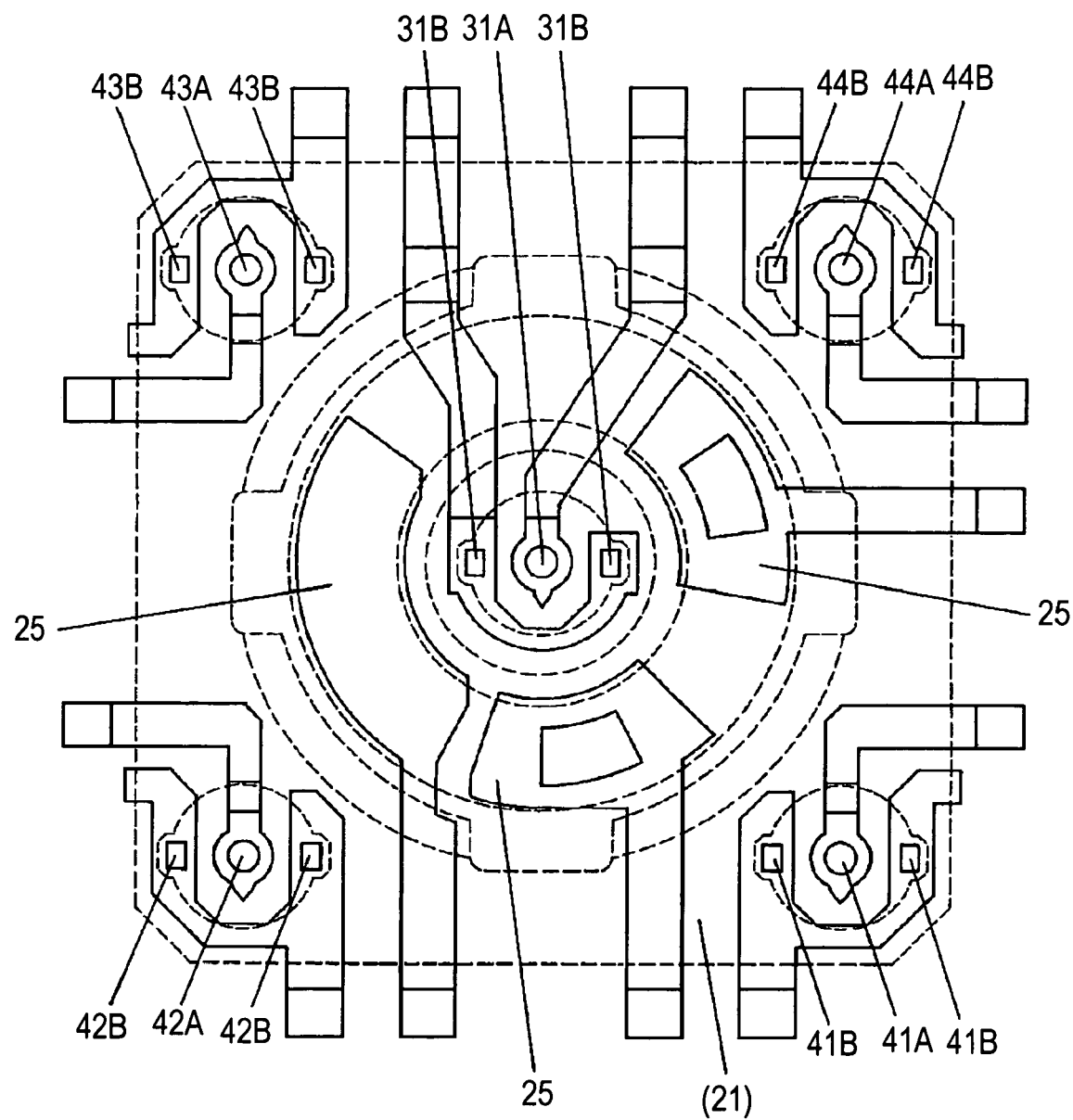
FIG. 7 shows a state of conductive members embedded in the case of multi operating electronic component shown in FIG. 1.

FIG. 7 shows the state of conductive members embedded in case 21. On the four sides of case 21, three independent terminals are led from fixed contact 25 and two independent terminals are led from central contact 31A and outside contacts 31B of switch 31. In addition, eight independent terminals are led from central contacts 41A to 44A and outside contacts 41B to 44B of switches 41 to 44. The total of 13 terminals are formed as surface mount terminals and led from the four sides of case 21 in a solderable condition.

Since the total number of the terminals is as many as 13, all the four sides of case 21 can be fixedly soldered on a circuit board to be used. Furthermore, one of the four sides that has three terminals led thereto can be used as a marker to check the direction of mounting.

Figure 8:
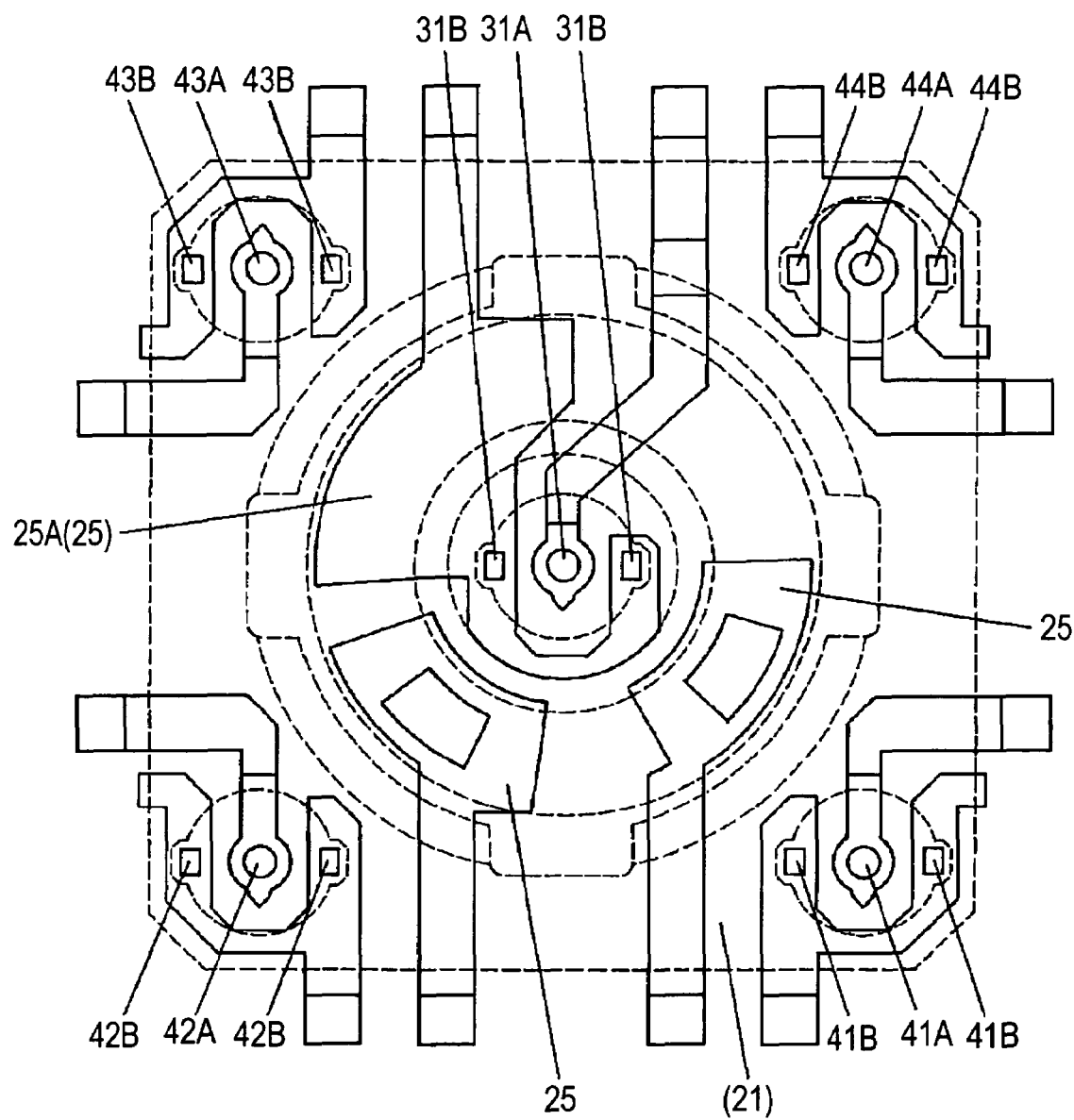
FIG. 8 shows another state of the conductive members embedded in the case of multi operating electronic component shown in FIG. 1.

The embedding condition and structure of the conductive members in case 21 are not limited to those described above. For example, as shown in FIG. 8, outside contacts 31B of switch 31 and common pattern 25A of the encoder could be formed integrally. This structure could reduce the number of terminals.

Rotary member 51, which is made of an insulating resin, is provided with central hole 55. Central hole 55 is cross-shaped in the upper part and is a circular hole in the lower part. Thus, central hole 55 is circular on the case 21 side and crisscross on the other side. Rotary member 51 is also provided on its bottom (a case 21 side) with flange 51A. The bottom surface of the periphery of flange 51A is placed on a support step formed inside of outer wall 23. The wall surface of the circular hole in the lower part is supported by the outer peripheral surface of inner wall 22. This is how rotary member 51 is rotatably supported.

Movable contact 52 is fixed on the bottom surface of flange 51A. As shown in FIG. 2, movable contact 52 has four elastic contact portions arranged at intervals of 90 degrees which conduct with each other. Fixed contact 25 formed on case 21 in correspondence with the four elastic contact portions is composed of three independent contact patterns shown in FIG. 4. Flange 51A has radially corrugated surface 51B on its top side. In other words, the face of flange 51A that is opposite to case 21 is composed as corrugated surface 51B. The corrugations are arranged at a pitch angle corresponding to an output signal which is generated by fixed contact 25 and movable contact 52. In this manner, fixed contact 25 and movable contact 52 form an incremental encoder, which is a rotationally actuated component at least partly formed in case 21.

Click spring 61, which is approximately circular ring shaped, is mounted in case 21 as follows. Click spring 61 has a pair of a set of horizontal portion 61C and drooping portion 61A drooping from the edge of horizontal portion 61C, the pair being symmetric with respect to the center of click spring 61. Drooping portions 61A have an arrowhead-shaped bottom end, and are press-fitted into fixing holes 24A formed in rectangular protrusions 24 of case 21.

Click spring 61 includes dowel portion 61B, which is formed on elastic arm 61D extending between horizontal portions 61C, and is in elastic contact with corrugated surface 51B of rotary member 51. Click spring 61 further includes sliding surface 61E, which is formed on elastic arm 61F extending on the other side of click spring 61 to produce a predetermined torque, and is also in elastic contact with corrugated surface 51B.

Cover member 71, which is made of a metal plate, has caulking legs 71A and lower surface portion 71B. Caulking legs 71A are bent downward from the side edges of lower surface portion 71B so as to hold case 21. In such a manner, cover member 71 is combined with case 21. Lower surface portion 71B is made of a flat plate and formed into the shape corresponding to the periphery of the top surface of case 21 so as to be laid on case 21. Lower surface portion 71B has a throughhole at each corner. Operation portions 41G to 44G of drivers 41E to 44E in switches 41 to 44 protrude from the respective throughholes by a predetermined length. The upward biasing forces of movable contacts 41C to 44C make the top surfaces of circular large-width portions 41F to 44F of drivers 41E to 44E come into contact with lower surface portion 71B, thereby reducing jouncing and other problems.

Cover member 71 is provided at its center with upper surface portion 71C which is above lower surface portion 71B. Upper surface portion 71C and lower surface portion 71B are connected by bridge portions 71E. Upper surface portion 71C has circular hole 71D in its center. Upper surface portion 71C is placed on outer wall 23 of case 21 so as to prevent rotary member 51 from coming off upward. In other words, cover member 71 is combined with case 21 so as to prevent rotary member 51 from moving away from case 21.

Upper surface portion 71C is further in contact with horizontal portion 61C of click spring 61 so as to prevent click spring 61 from coming off. The bottom surface of horizontal portion 61C of click spring 61 is supported by the top surface of the inner walls of rectangular protrusion 24. Thus, each horizontal portion 61C of click spring 61 is sandwiched between upper surface portion 71C and the top surface of the inner walls of rectangular protrusion 24 so as to be prevented from moving vertically. Click spring 61 can be mounted by being press-fixed to case 21 and then attaching cover member 71 to case 21 from above. This simplifies the mounting process of click spring 61, thus providing excellent workability.

Rotary member 51 is provided at the top end of its cylindrical portion exposed on circular hole 71D with coil spring 81 which increases in diameter upward. The top of coil spring 81 is supported on the bottom surface of approximately disk-shaped knob main body 91A of operating knob 91. Operating knob 91 is made of a resin and directly operated by the user's finger when mounted on a device. Thus, operating knob 91 also serves as an exterior part of the device.

As shown in FIG. 6, approximately disk-shaped knob main body 91A has downward-protruding center leg 92 and four elastic claws 93 surrounding center leg 92 in the center of the bottom surface thereof. Center leg 92 protrudes downward further than elastic claws 93 by a predetermined length, and has a semispherical bottom end. On the other hand, elastic claws 93 are arranged at a pitch of 90 degrees to surround center leg 92 with a predetermined spacing, and have outward-protruding claw portions 93A at their bottom ends.

Operating knob 91 is combined with rotary member 51 by inserting center leg 92 and four elastic claws 93 from above into central hole 55 of rotary member 51. Namely, elastic claws 93 are an engaging portion to be engaged with rotary member 51. It is preferable that elastic claws 93 are inserted into central hole 55 by being aligned with the straight lines of the cross shape in the upper part. In other words, central hole 55 of rotary member 51 is preferably shaped to fit elastic claws 93 as the engaging portion, and elastic claws 93 are preferably inserted into central hole 55. Such a simple structure allows operating knob 91 to be engaged with rotary member 51 in such a manner as to be rotatable together, and operating knob 91 to be movable vertically and tiltable. Furthermore, when tilted by the user, operating knob 91 has a restoring force in accordance with the bending of elastic claw 93. If elastic claws 93 are designed so as to be able to be slightly bent toward the center, it can reduce jouncing and other problems of operating knob 91.

Operating knob 91 is provided on its bottom surface with ring-shaped pressing portion 94, which faces switches 41 to 44 when knob main body 91A is in a horizontal state. In other words, ring-shaped pressing portion 94, center leg 92 and elastic claws 93 are formed on the same side of knob main body 91A. Knob main body 91A includes ring-shaped pressing portion 94 facing switches 41 to 44. Ring-shaped pressing portion 94 has a predetermined spacing from operation portions 41G to 44G of switches 41 to 44.

As shown in FIG. 1 and so on, the inside of ring-shaped pressing portion 94 is preferably recessed to accumulate the center portion inside outer wall 23 of case 21. It is also preferable to provide operating protrusions 96 in the central and peripheral positions on the top surface of knob main body 91A as shown in FIG. 2 because they can improve operability.

When operating knob 91 is combined with rotary member 51, coil spring 81 is vertically compressed by a predetermined amount. The biasing force of coil spring 81 makes knob main body 91A biased upward against rotary member 51. Claw portions 93A of elastic claws 93 are locked to intermediate step 51C formed at the middle height of central hole 55 of rotary member 51. This is how operating knob 91 is kept in a horizontal state. Furthermore, coil spring 81 helps operating knob 91 to return to the original condition after being moved downward or tilted, thereby smoothing the operation of operating knob 91. In this structure, the biasing force of coil spring 81 reduces jouncing of operating knob 91, thereby improving the quality of the multi operating electronic component. The bottom end of center leg 92 faces insulating sheet 31D of switch 31 with a slight spacing therebetween.

Coil spring 81 disposed between knob main body 91A and rotary member 51 can have another shape or can be another elastic member. Also, coil spring 81 can be disposed not between knob main body 91A and rotary member 51, but between knob main body 91A and cover member 71. Furthermore, instead of providing coil spring 81, an elastic material such as a flat rubber can be disposed around circular hole 71D in the center of cover member 71 in such a manner as to rotate operating knob 91, thereby improving dust resistance.

Figure 9:
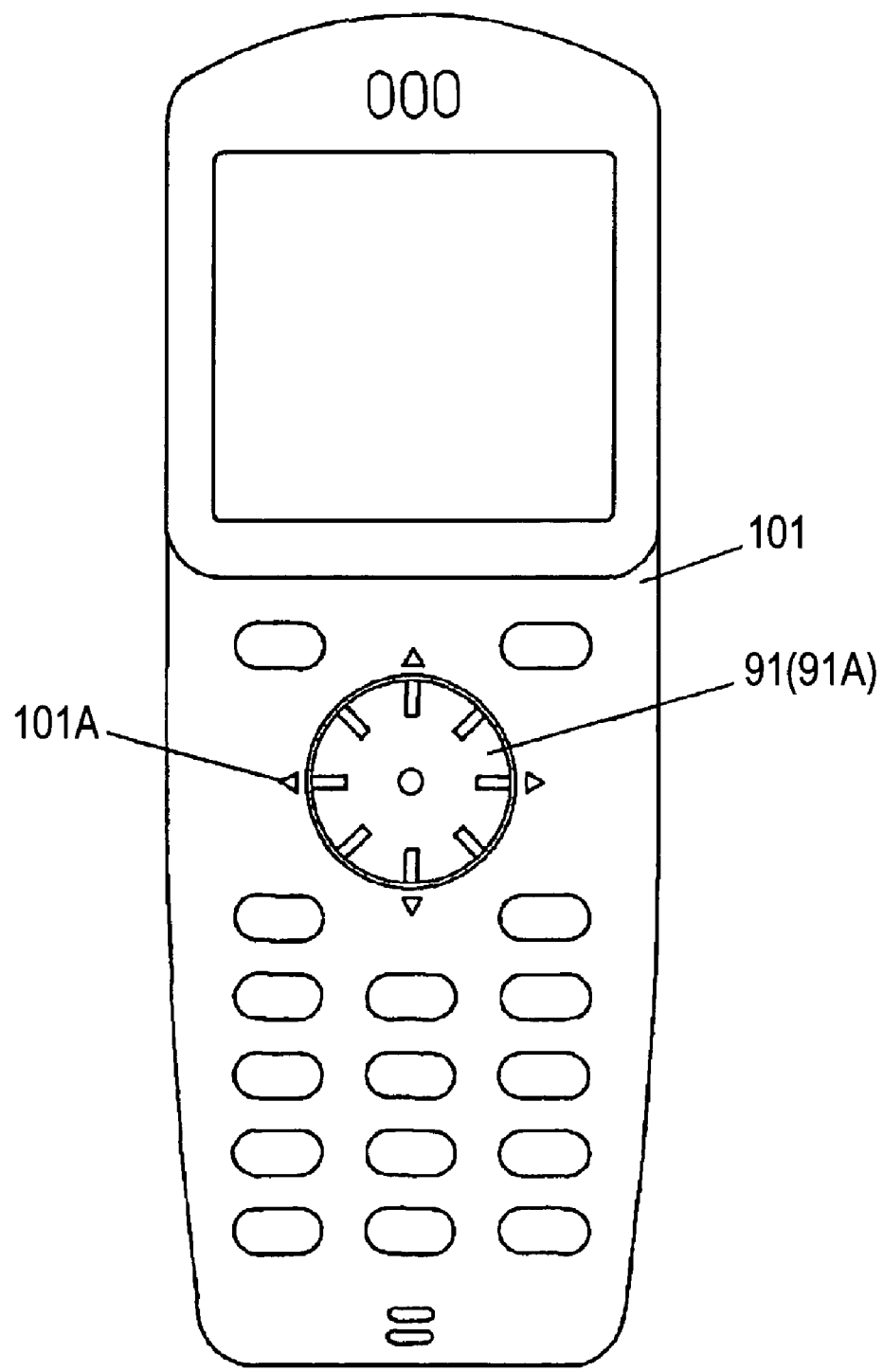
FIG. 9 is a front view of a device on which the multi operating electronic component of FIG. 1 is mounted.

As described above, the multi operating electronic component of the present embodiment is structured. The multi operating electronic component is used to be mounted on a mobile phone or the like. For example, as shown in FIG. 9, the electronic component is mounted on a mobile phone in such a manner that the top surface of knob main body 91A of operating knob 91 is exposed in the center of the control surface of outer package 101 of the mobile phone. In this case, it is preferable to provide indicators 101A around operating knob 91 on outer package 101 so as to indicate the positions of switches 41 to 44. Although the control surface of outer package 101 includes other elements such as a display unit made of liquid crystal or the like and ten keys, the detailed description of them will be omitted.

The operation of the multi operating electronic component structured as above will be described as follows. First will be described a case of turning knob main body 91A of operating knob 91 which is in a horizontal state as shown in FIG. 1. When the user turns knob main body 91A, center leg 92 and four elastic claws 93 inserted into central hole 55 of rotary member 51 are rotated. The rotation of elastic claws 93 causes the approximately cross-shaped wall formed in the upper part of central hole 55 to be pushed in the rotated direction, thereby making rotary member 51 rotate together with elastic claws 93. At this moment, rotary member 51 is rotated while being supported by case 21 and cover member 71. Along with the rotation of flange 51A, movable contact 52 also rotates relative to fixed contact 25. This provides pulse signals having predetermined phase differences via the three terminals connected with fixed contact 25.

As described above, when the multi operating electronic component is mounted on a device, the top surface of knob main body 91A is often designed to be exposed on outer package 101. In this case, the user can turn operating knob 91 either by running a finger around the periphery of the top surface of knob main body 91A or by hooking a finger on operating protrusion 96 on the periphery.

When manipulating operating knob 91 with a finger in this manner, the user may apply a slight downward pressing force on operating knob 91 at the same time. This causes coil spring 81 to be further compressed in the part corresponding to the pressed side of operating knob 91. As a result, knob main body 91A is rotated at a tilt around the root of claw portion 93A of elastic claw 93 that is on the side opposite to the pressed side of operating knob 91. In this condition, switch 31 may be applied with a slight pressing force via center leg 92. Therefore, the reversing force of movable contact 31C of switch 31 is preferably determined by taking such an operating condition into consideration. Such determination can prevent the state of switch 31 during rotation from being switched unintentionally.

When knob main body 91A is rotated at a tilt, ring-shaped pressing portion 94 may rotate in contact with one of operation portions 41G to 44G of switches 41 to 44. Therefore, the reversing forces of movable contacts 41C to 44C of switch 41 to 44 preferably determined by taking such an operating condition into consideration. Such determination can prevent the states of switches 41 to 44 during rotation from being switched unintentionally.

Figure 10:
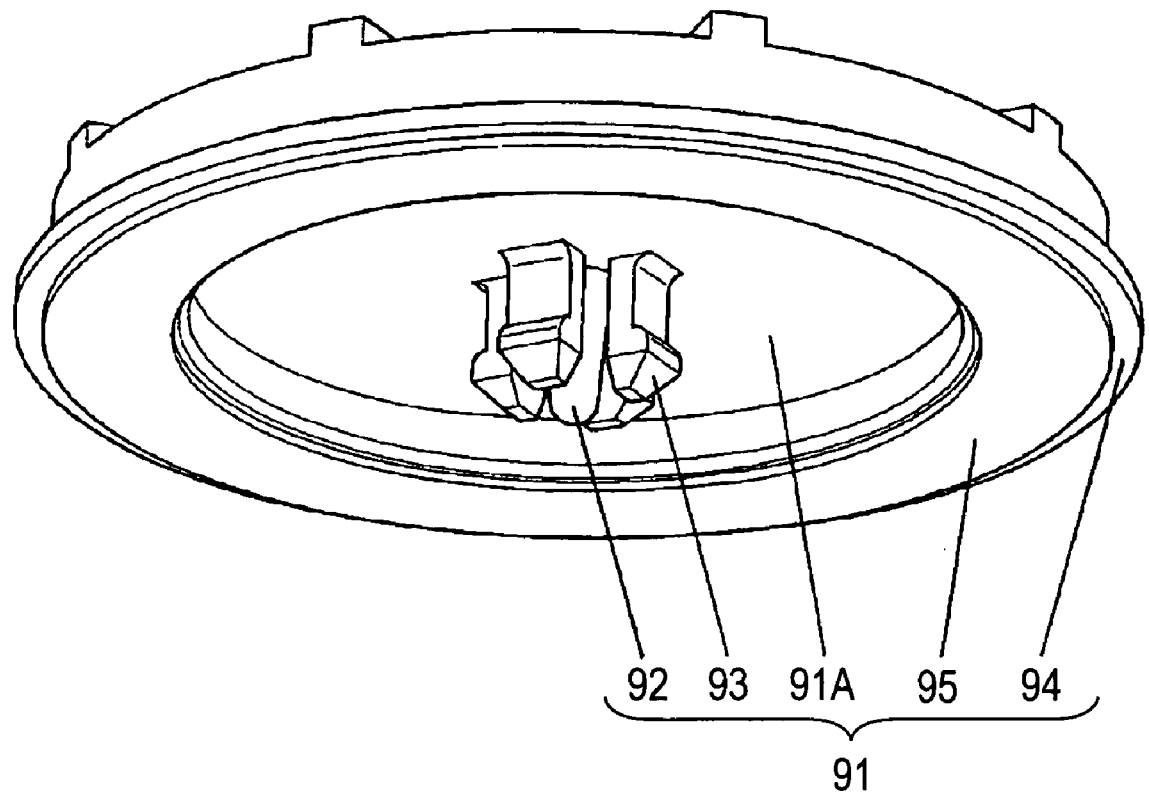
FIG. 10 is a perspective view of the operating knob of FIG. 6 seen from a bottom side when the operating knob is provided with a friction reducing member.
Figure 11:
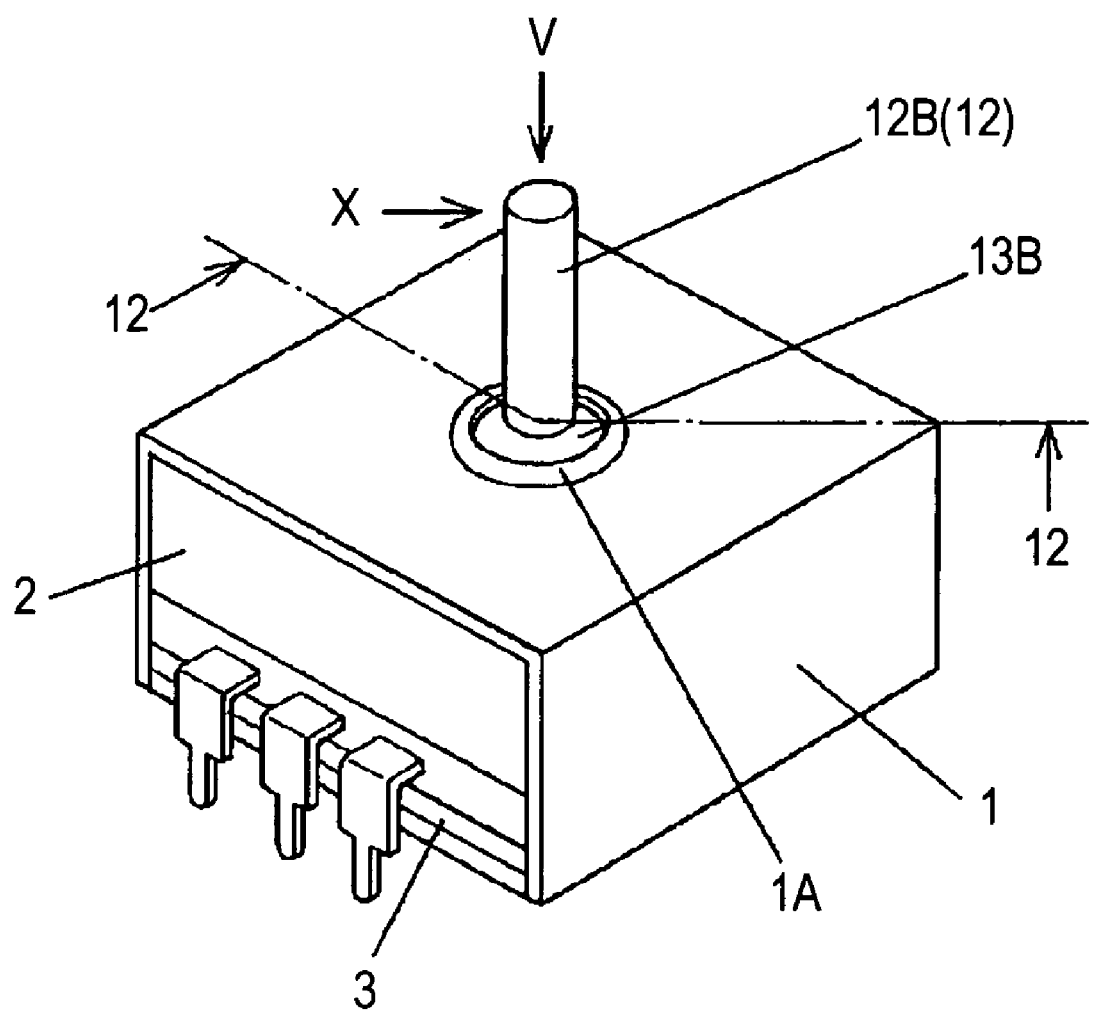
FIG. 11 is an external perspective view of a conventional multi operating electronic component.
Figure 12:
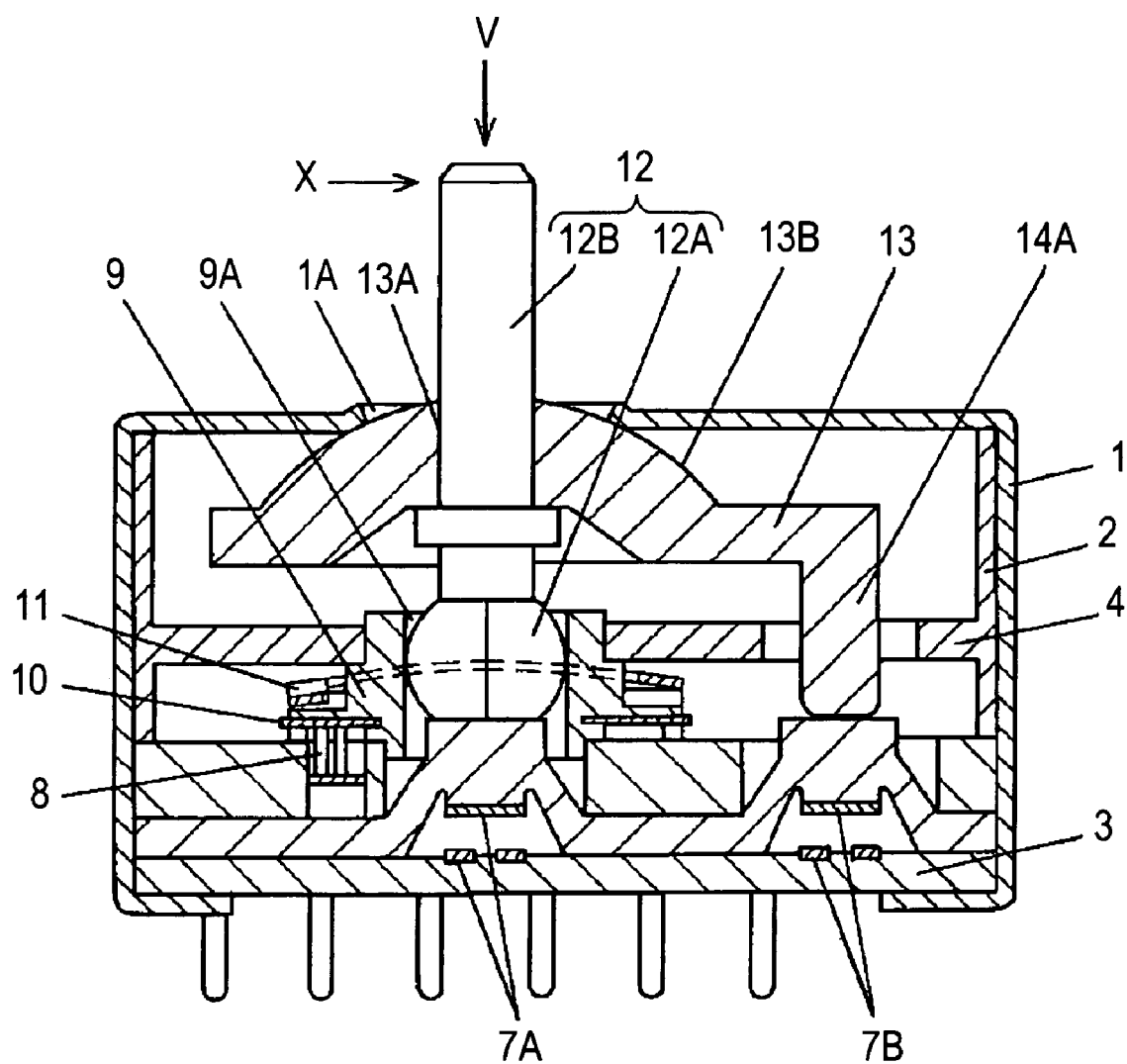
FIG. 12 is a cross sectional view of the multi operating electronic component taken along line 12—12 of FIG. 11.
Figure 13:
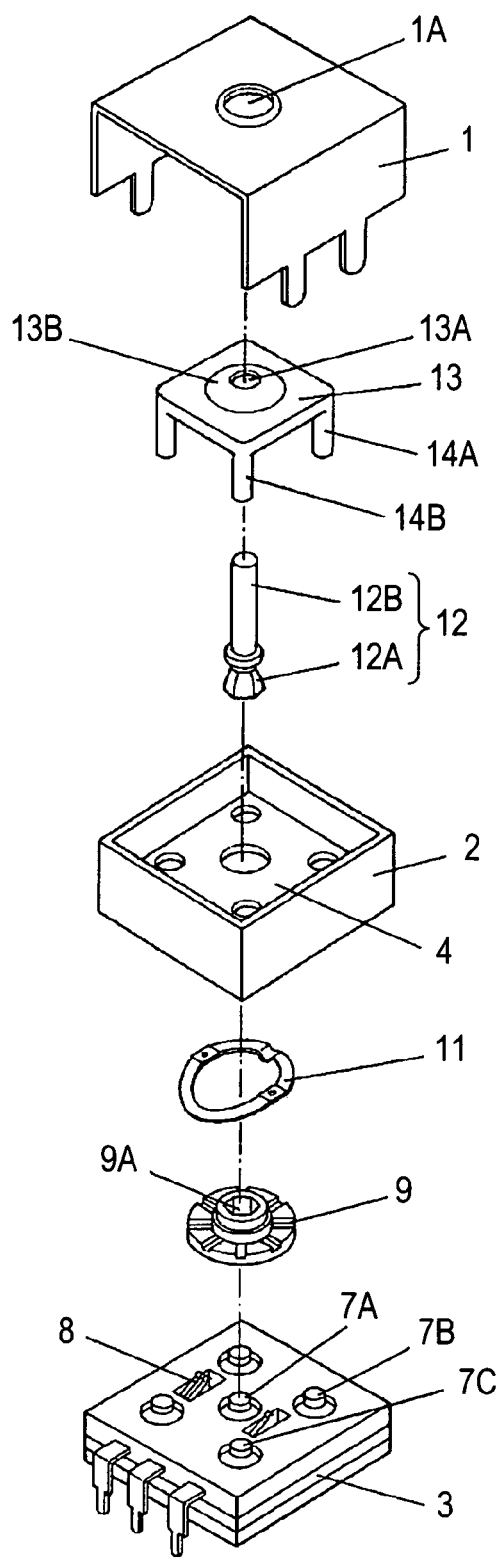
FIG. 13 is an exploded perspective view of the multi operating electronic component of FIG. 11.
Figure 14:
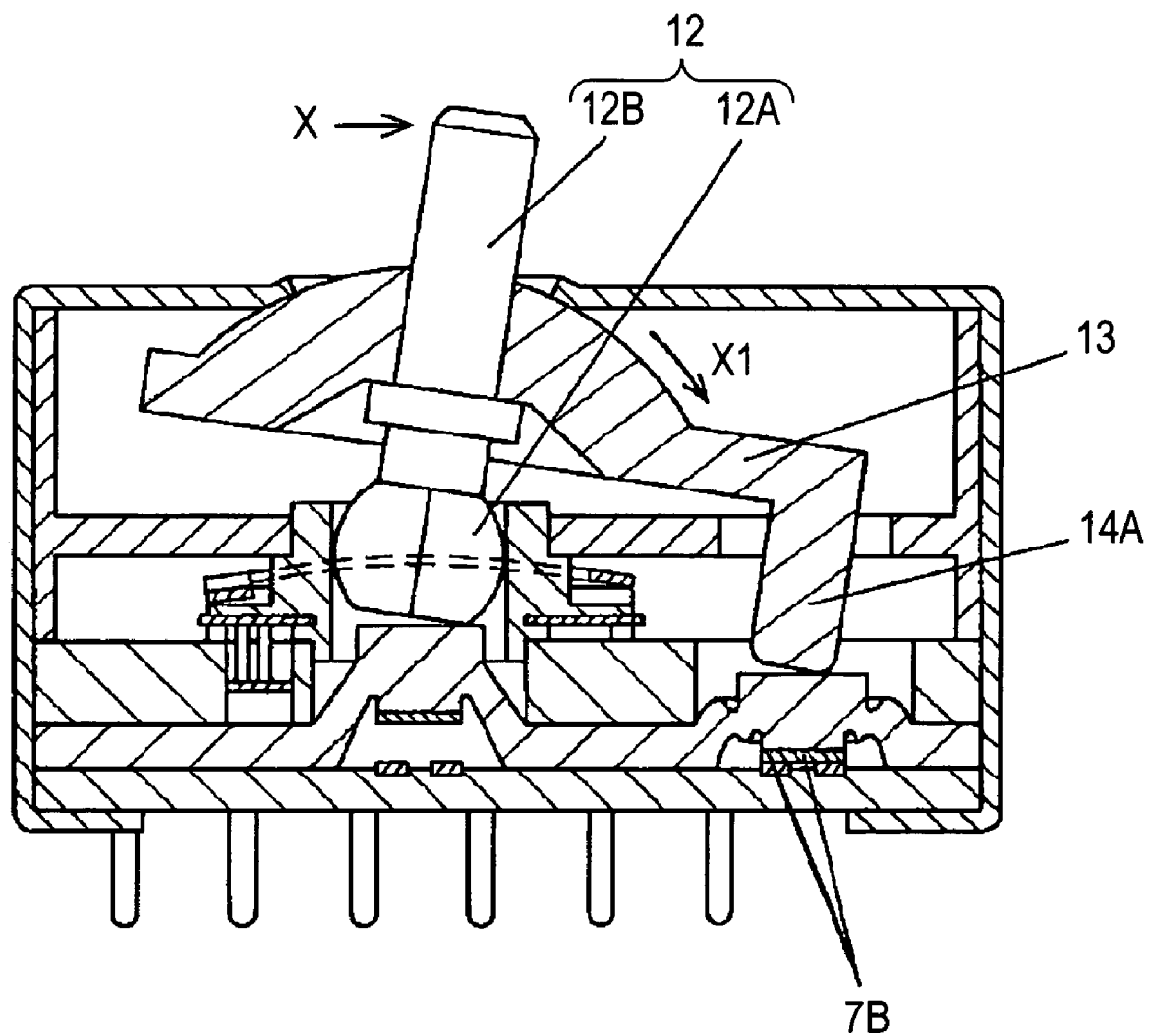
FIG. 14 is a cross sectional view showing tilting of an operating portion of the multi operating electronic component shown FIG. 12.

When knob main body 91A is rotated at a tilt in contact with one of operation portions 41G to 44G, the contact force may damage the feeling of rotation for the user, and may also cause problems such as scraping ring-shaped pressing portion 94. To avoid these problems, as shown in the perspective view of FIG. 10, it is preferable to mount friction reducing member 95 along ring-shaped pressing portion 94 so as to be disposed between ring-shaped pressing portion 94 and operation portions 41G to 44G. Friction reducing member 95 can be a tape-shaped member made of, e.g. a fluorocarbon resin or a polyimide resin. In this structure, the action of friction reducing member 95 reduces the friction between one of operation portions 41G to 44G and ring-shaped pressing portion 94. This allows smooth rotation of operating knob 91, and prevents ring-shaped pressing portion 94 from being scraped.

When rotary member 51 is rotated, the rotation of flange 51A causes dowel portion 61B of click spring 61 to come into elastic contact with corrugated surface 51B on the top surface of flange 51A, thereby creating a predetermined click feel. At this moment, click spring 61 is subject to the force in the direction for click spring 61 to come off that is opposite to the direction for click spring 61 to be press-fixed. In this structure, upper surface portion 71C of cover member 71 combined with case 21 presses horizontal portion 61C of click spring 61 from above. Thus, cover member 71 prevents click spring 61 from coming off in the direction where click spring 61 moves away from case 21. As a result, a sharp click feel is maintained for a long period.

Second will be described a case where knob main body 91A of operating knob 91 which is in a horizontal state as shown in FIG. 1 is pressed vertically downward, that is, in the direction of case 21. When the user presses knob main body 91A vertically downward, coil spring 81 is further compressed entirely, thereby moving operating knob 91 downward. As a result, the bottom end of center leg 92 provided on knob main body 91A applies a downward pressing force in the center of movable contact 31C of switch 31 from over insulating sheet 31D. When the downward pressing force exceeds a predetermined level, the center of movable contact 31C is turned upside down with a click feeling, thus making the bottom surface of the center come into contact with central contact 31A. This brings central contact 31A and outside contacts 31B into electric connection via movable contact 31C, thereby bringing the terminals connected to these contacts into the conduction state.

The dimensions of ring-shaped pressing portion 94 and operation portions 41G to 44G of switches 41 to 44 are designed not to come into contact with each other when switch 31 is turned on. This structure is desirable because it provides a clear click feeling during the operation of switch 31.

When operating knob 91 is traveled downward, the approximately cross-shaped wall in the upper part of central hole 55 guides four elastic claws 93 arranged around center leg 92 down to the lower part of central hole 55. Operating knob 91 can travel in this manner with little stumbling.

When the user releases the downward pressing force from operating knob 91, movable contact 31C is restored to the original shape with the convexly domed top by its own restoring force. This makes central contact 31A and outside contacts 31B electrically independent of each other again. Movable contact 31C pushes center leg 92 upward via insulating sheet 31D. In addition, coil spring 81 is restored to the original state. Therefore, knob main body 91A is smoothly pushed back by these upward biasing forces. At this moment, four elastic claws 93 are guided in the same manner as described above by the approximately cross-shaped wall of central hole 55 so as to move operating knob 91 upward. This allows operating knob 91 to be restored to the original state smoothly. Then, claw portions 93A of elastic claws 93 come into contact with the bottom surface of intermediate step 51C formed in central hole 55 of rotary member 51 so as to stop operating knob 91 and return it to the non-operated state shown in FIG. 1.

The pressing down operation to activate switch 31 can be performed by the user's pressing the center of the top surface of operating knob 91. It is preferable that while operating knob 91 is being pressed and restored to the original state, rotary member 51 is kept stopped by fitting dowel portion 61B of click spring 61 into the recess formed on the top surface of flange 51A.

The following is a description of operating one of switches 41 to 44 by pressing the periphery of the top surface of operating knob 91. The description will be focused on the operation of switch 41.

In this case, the user presses somewhere on the periphery of the top surface of operating knob 91 that corresponds to the direction having one of switches 41 to 44. When operating knob 91 is mounted as shown in FIG. 9, the user can press operating knob 91 as described above, with indicators 101A on outer package 101 as a guide. As a result of the pressing, operating knob 91 is tilted around the root of claw portion 93A of elastic claw 93 that is on the side opposite to the pressed side of operating knob 91 in such a manner that the pressed side of operating knob 91 is positioned lower. At this moment, elastic claw 93 in the tilted side is pressed by the approximately cross-shaped wall of central hole 55 and bent toward the center. As described above, the semispherical shape of the bottom end of center leg 92 can facilitate the tilting of operating knob 91 even when center leg 92 comes into contact with switch 31.

The tilting causes coil spring 81 to be greatly compressed locally on the pressed side of operating knob 91. As a result, ring-shaped pressing portion 94 operates switch 41 corresponding to the pressed side of operating knob 91. In other words, the part of ring-shaped pressing portion 94 that corresponds to the pressed side of operating knob 91 comes into contact with operation portion 41G of switch 41, thereby applying a downward pressing force from above. When ring-shaped pressing portion 94 is flat-shaped, the top end of operation portion 41G is preferably semispherical.

When ring-shaped pressing portion 94 presses operation portion 41G downward, driver 41E applies a downward pressing force in the center of movable contact 41C of small-diameter pressing portion 41H via insulating sheet 41D. When the downward pressing force exceeds a predetermined level, the center of movable contact 41C is turned upside down with a click feeling, thus making the bottom surface of the center of movable contact 41C come into contact with central contact 41A. This brings central contact 41A and outside contacts 41B into electric connection via movable contact 41C, thereby bringing the terminals connected to these contacts into the conduction state. In other words, when knob main body 91A is tilted around a point at which elastic claws 93 as the engaging portion are engaged with central hole 55 of rotary member 51, ring-shaped pressing portion 94 presses switch 41 that corresponds to the tilted side of operating knob 91. The size and other conditions of operating knob 91 are set to prevent the states of the other switches 42 to 44 and switch 31 from being switched.

When the user releases the pressing force from the periphery of the top surface of operating knob 91, movable contact 41C is restored to the original shape with the convexly domed top by its own restoring force. This makes central contact 41A and outside contacts 41B electrically independent of each other again. Movable contact 41C pushes driver 41E upward via insulating sheet 41D, and then driver 41E pushes ring-shaped pressing portion 94 upward. Driver 41E is stopped when the top surface of circular large-width portion 41F comes into contact with lower surface portion 71B of cover member 71. At the same time as this, coil spring 81 which is locally compressed and elastic claws 93 which is bent are both restored to the original states, and these forces return operating knob 91 to a non-operation state shown in FIG. 1.

Since switches 42 to 44 are operated in the same manner as switch 41, the description will be omitted. In the case of tilting operating knob 91, it is possible to switch adjacent two of switches 41 to 44 concurrently.

As described hereinbefore, the multi operating electronic component of the present embodiment is structured as a single electronic component. The rotation of operating knob 91 on the device side can provide a predetermined output from the rotationally actuated component such as an encoder. In addition, pressing operating knob 91 to move operating knob 91 vertically downward can switch the state of switch 31. Tilting operating knob 91 can switch the state of one of switches 41 to 44. These operations can be done continuously. Operating knob 91 on the device side, itself, can be used as the member to operate switches 31 and 41 to 44. This can reduce the height including the thickness of operating knob 91. It is alternatively possible that the main body of the multi operating electronic component shown in FIG. 3 is previously reflow-soldered to a circuit board and that operating knob 91 and coil spring 81 are mounted later on the package of the device.

As described above, after press-fitted into case 21, click spring 61 is mounted by being pressed by cover member 71 so as not to move in the direction in which click spring 61 can come off. This allows click spring 61 to be mounted in a simple manner, and the mounting to be firm and stable. Although the present embodiment has four switches 41 to 44, the number of pressing peripheral switches is not limited to four.

In the above description, the engaging portion around center leg 92 of knob main body 91A are formed of four elastic claws 93 and are inserted into approximately cross-shaped central hole 55 of rotary member 51. However, the number of elastic claws 93 is not limited to four. It is alternatively possible to arrange a plurality of elastic claws 93 around center leg 92, and to insert them into the correspondingly shaped central hole 55 of rotary member 51. The presence of elastic claws 93 simplifies the structure of the engaging portion of operating knob 91 to be engaged with rotary member 51. The presence of elastic claws 93 is also preferable because it provides a restoring force corresponding to the degree of its bending when knob main body 91A is tilted. In a structure where operating knob 91 and rotary member 51 are rotated together, engaging portions other than elastic claws 93 can be used.

In the above description, as the rotary functional unit functioning according to the rotation of operating knob 91, an incremental encoder structure is described. Besides this, another encoder structure, a variable resistor structure or a rotary switch structure can be used. In other words, it is only necessary to install a rotationally actuated component which is operated by the rotation of rotary member 51.

The structures of switches 31 and 41 to 44 are not limited to those mentioned above. Alternatively, other switches for switching between the states, such as push-off switches and two-step switches can be used.

In the multi operating electronic component of the present invention, rotating the operating knob which is an outer component of the device can provide a predetermined signal, and the user can operate each pressing switch by operating the operating knob. This structure enables the multi operating electronic component to have a reduced height including the thickness of the operating knob, thus being useful in structuring the input operation unit of various types of electronic devices.

What is claimed is:

1. A multi operating electronic component comprising:
   a case including a pressing central switch provided in a center thereof and a plurality of pressing peripheral switches each provided in a periphery thereof;
   a rotary member provided with a central hole and a flange;
   a cover member combined with the case for preventing the rotary member from moving away from the case;
   an operating knob comprising:
      a knob main body including a ring-shaped pressing portion facing the plurality of pressing peripheral switches;
      a center leg provided on a same side as the ring-shaped pressing portion of the knob main body; and
      an engaging portion provided around the center leg and engaged with the rotary member;
   a rotationally actuated component at least part of which is formed in the case, the rotationally actuated component being operated by rotation of the rotary member;
   wherein the center leg and the engaging portion are inserted into the central hole of the rotary member in such a manner as to be movable vertically and tiltable, the engaging portion is engaged with the central hole so as to rotate the rotary member together with the knob main body, when the knob main body is pressed in a direction of the case, the center leg presses the pressing central switch, and when the knob main body is tilted around a point at which the engaging portion is engaged with the central hole of the rotary member, the ring-shaped pressing portion presses the pressing peripheral switch that corresponds to a tilted direction.

2. The multi operating electronic component according to claim 1, further comprising:
   an elastic member disposed between the knob main body and one of the rotary member and the cover member.

3. The multi operating electronic component according to claim 1,
   wherein the engaging portion includes a plurality of elastic claws arranged around the center leg, the central hole of the rotary member is shaped to correspond to a shape of the plurality of elastic claws, and the plurality of elastic claws are inserted into the central hole of the rotary member.

4. The multi operating electronic component according to claim 1, further comprising a click spring including a dowel portion,
   wherein the flange of the rotary member has a corrugated surface on a side thereof opposite to the case, the dowel portion is in elastic contact with the corrugated surface so that the click spring provides a click feel when the rotary member is rotated, and the case is provided with a fixing hole into which the click spring is press-fitted.

5. The multi operating electronic component according to claim 4,
   wherein the cover member prevents the click spring from coming off in a direction where the click spring moves away from the case.

6. The multi operating electronic component according to claim 1, further comprising a friction reducing member disposed between the ring-shaped pressing portion of the knob main body and the plurality of pressing peripheral switches.

7. The multi operating electronic component according to claim 1,
   wherein the case further includes a fixed contact disposed between the pressing central switch and the plurality of pressing peripheral switches, the flange of the rotary member has a movable contact fixed thereto, the movable contact being in contact with the fixed contact, and the fixed contact and the movable contact form the rotationally actuated component.

* * * * *